United States Patent Office 2,978,516
Patented Apr. 4, 1961

2,978,516

ALCOHOLS

Karl Klager, Monrovia, Calif., assignor to Aerojet-General Corporation, Azusa, Calif., a corporation of Ohio No Drawing. Filed Dec. 8, 1953, Ser. No. 397,018

7 Claims. (Cl. 260—632)

This invention relates to new compositions of matter and a method for their preparation. In particular it relates to β-geminal dinitro alcohols having the genreal formula:

$$\text{R}-\underset{\underset{\text{NO}_2}{|}}{\overset{\overset{\text{NO}_2}{|}}{\text{C}}}-\text{CH}_2\text{CH}_2\text{OH}$$

wherein R is a lower alkyl group.

These compounds find valuable use as intermediates in the preparation of nitro-containing esters of polymerizable acids, the polymers of which are important explosive desensitizers, as disclosed in assignee's copending application No. 397,006, filed December 8, 1953. Moreover they readily combine with isocyanates to produce a variety of polynitro urethanes, important as high explosives. They also undergo oxidation to yield β-dinitro carboxylic acids, important components of propellant fuels, as disclosed in assignee's copending application No. 392,476, filed November 16, 1953, now abandoned.

α-Substituted nitro alcohols are conveniently prepared by the reaction of aldehydes with nitroparaffines. The β-substituted alcohols, however, do not yield to similar methods of synthesis and heretofore were unknown in the art. These compounds exhibit many desirable features not attributable to the α-substituted isomers, due to the reactivity of their hydroxyl groups, which readily enter into reaction such as esterification, oxidation, etc.

In accordance with the present invention β-geminal dinitro alcohols are prepared by the reaction of an alkali or alkaline earth metal salt of nitrous acid upon a β-geminal dinitroalkyl amine salt of a mineral acid in accordance with the general reaction scheme set forth below:

$$\text{R}-\underset{\underset{\text{NO}_2}{|}}{\overset{\overset{\text{NO}_2}{|}}{\text{C}}}-\text{CH}_2\text{CH}_2-\text{NH}_2\cdot\text{X}+\text{NO}_2^-\longrightarrow \text{R}-\underset{\underset{\text{NO}_2}{|}}{\overset{\overset{\text{NO}_2}{|}}{\text{C}}}-\text{CH}_2\text{CH}_2\text{OH}$$

wherein R is a lower alkyl radical and X is a strong mineral acid.

The β-geminal dinitro amine salts used as starting materials for this reaction are prepared by the action of a strong mineral acid upon the corresponding isocyanates which are obtained from the corresponding acid halide, as disclosed in my copending application No. 405,515, filed January 21, 1954, now Patent No. 2,923,726, issued February 2, 1960.

To more fully illustrate my invention the following examples are presented. It is to be understood, however, that these examples are presented merely as a manner of illustration and are not intended to limit the scope of the invention in any way.

EXAMPLE I

*Preparation of 3,3-dinitrobutanol*

In an Erlenmeyer flask 20 gm. of 3,3-dinitrobutylamine hydrochloride was dissolved in 200 ml. water. A solution of 7.8 gm. sodium nitrite in 50 ml. water was added and the resulting solution was heated to 45 to 50° C. The reaction started with a vigorous evolution of nitrogen and the temperature rose to 66° C. After about 60 seconds, a clear greenish solution was formed, which was maintained at a temperature of 60° C. for a period of 10 minutes. The aqueous solution was cooled and extracted twice with methylene chloride; and the methylene chloride solution was then washed with saturated sodium chloride solution and dried over sodium sulfate. After evaporation of the solvent the residue was distilled at 70 to 80° C. (airbath temperature) at 1 micron, yielding 9.2 gm., $n_D^{25}=1.4660$.

EXAMPLE II

*Preparation of 3,3-dinitro-1-pentanol*

When 3,3-dinitropentylamine hydrochloride is treated in the manner described under Example I, 3,3-dinitro-1-pentanol is obtained in 38% yield, B.P. 75–85° C. at 1.5 micron, $n_D^{25}=1.4672$.

Due to convenience and cost it is preferred to use β-geminal dinitro amine salts of hydrochloric acid as starting materials for the preparation of the alcohols of this invention.

In aqueous solution the respective reactants hydrolyze to produce their various components, the important members of which are β-geminal dinitroalkyl amine and nitrous acid. Although it is more convenient and the reaction proceeds more smoothly when the reactants are added as amine salts of a mineral acid and a salt of nitrous acid, it is apparent, that without departing from the scope of the invention, the reaction may be conducted in any manner which provides the fundamental reaction components, such as adding the amine itself to an acidified solution of a nitrite salt.

I have also found that by using as the starting material, 3,3-dinitrohexylamine hydrochloride, 3,3-dinitroheptylamine hydrochloride, 3,3-dinitrooctylamine hydrochloride, etc., and proceeding in accordance with the examples set forth above, the corresponding alcohols, namely, 3,3-dinitrohexanol, 3,3-dinitroheptanol, 3,3-dinitrooctanol, etc., are obtained.

It is evident from the foregoing discussion that a wide variety of β-geminal dinitro alcohols may be prepared simply by selecting the appropriate amine salt and proceeding in accordance with the teachings of this invention.

I claim:

1. The method for preparing β-geminal dinitro alcohols having the general formula:

$$\text{R}-\underset{\underset{\text{NO}_2}{|}}{\overset{\overset{\text{NO}_2}{|}}{\text{C}}}-\text{CH}_2\text{CH}_2\text{OH}$$

wherein R is a lower alkyl radical, which comprises reacting a nitrite salt selected from the group consisting of the alkali and alkaline earth metal nitrite salts with a β-geminal dinitroalkyl amine salt of a strong mineral acid having the general formula:

$$\text{R}-\underset{\underset{\text{NO}_2}{|}}{\overset{\overset{\text{NO}_2}{|}}{\text{C}}}-\text{CH}_2\text{CH}_2\text{NH}_2\cdot\text{X}$$

wherein R is a lower alkyl radical and X is a strong mineral acid.

2. The method for the preparation of β-geminal dinitro alcohols having the general formula:

$$\text{R}-\underset{\underset{\text{NO}_2}{|}}{\overset{\overset{\text{NO}_2}{|}}{\text{C}}}-\text{CH}_2\text{CH}_2\text{OH}$$

which comprises reacting a nitrite salt selected from a group consisting of alkali and alkaline earth metal nitrite salts with a β-geminal dinitroalkyl amine hydrochloride having the general formula:

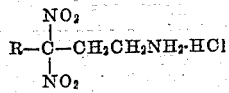

wherein R is a lower alkyl radical.

3. The method for the preparation of 3,3-dinitrobutanol which comprises reacting 3,3-dinitrobutylamine hydrochloride with a nitrite salt selected from a group consisting of alkali and alkaline earth metal nitrite salts.

4. The method for the preparation of 3,3-dinitro-1-pentanol which comprises reacting 3,3-dinitropentylamine hydrochloride with a nitrite salt selected from a group consisting of alkali and alkaline earth metal nitrite salts.

5. The method of claim 3 wherein the nitrite salt is sodium nitrite.

6. The method of claim 4 wherein the nitrite salt is sodium nitrite.

7. The method for preparing β-geminal dinitro alcohols having the general formula:

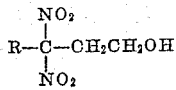

wherein R is a lower alkyl radical, which comprises reacting a nitrite salt selected from the group consisting of the alkali and alkaline earth metal nitrite salts with a β-geminal dinitroalkyl amine salt of a strong mineral acid having the general formula:

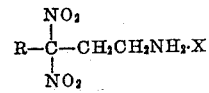

wherein R is a lower alkyl radical and X is a strong mineral acid, at a temperature of from about 45° to about 66° C.

References Cited in the file of this patent
UNITED STATES PATENTS

| | | |
|---|---|---|
| 2,139,121 | Hass | Dec. 6, 1938 |
| 2,522,959 | Plaut | Sept. 19, 1950 |

FOREIGN PATENTS

| | | |
|---|---|---|
| 494,666 | Great Britain | Oct. 24, 1938 |

OTHER REFERENCES

An Introduction to Organic Chemistry by Alexander Lowy et al. 5th Ed. John Wiley & Sons, New York, 1940, page 54.

Shechter et al.: Jour. Am. Chem. Soc. 74 (July 20, 1952), received Jan. 4, 1952, pp. 3364–3368.

Hass et al.: Chem. Reviews, vol. 32 (1943), p. 399.